United States Patent [19]
Pohl et al.

[11] Patent Number: 5,925,253
[45] Date of Patent: Jul. 20, 1999

[54] HYDROLYTICALLY STABLE RESINS FOR USE IN ANION-EXCHANGE CHROMATOGRAPHY

[75] Inventors: Christopher Pohl, Union City; Charaniit Saini, Milpitas; Jacek Jagodzinski, Redwood City, all of Calif.

[73] Assignee: Dionex Corporation, Sunnyvale, Calif.

[21] Appl. No.: 09/016,578

[22] Filed: Jan. 30, 1998

Related U.S. Application Data

[62] Division of application No. 08/805,858, Mar. 3, 1997.
[51] Int. Cl.$^6$ .................................................. B01D 15/08
[52] U.S. Cl. .................. 210/635; 210/656; 210/198.2
[58] Field of Search ............................. 210/656, 198.2, 210/635, 502.1, 679, 683; 521/32

[56] References Cited

U.S. PATENT DOCUMENTS

| | | | |
|---|---|---|---|
| 3,228,920 | 1/1966 | D'Alelio | 260/88.1 |
| 4,086,222 | 4/1978 | Lindquist | 210/656 |
| 4,101,461 | 7/1978 | Strop et al. | 521/32 |
| 4,118,316 | 10/1978 | Talley | 210/198.2 |
| 4,182,804 | 1/1980 | Serboli et al. | 521/32 |
| 4,883,598 | 11/1989 | Riethorst | 210/656 |
| 5,147,536 | 9/1992 | Engstrom | 210/198.2 |
| 5,230,885 | 7/1993 | Jaxa-Chamiec et al. | 521/32 |
| 5,350,523 | 9/1994 | Tomoi et al. | 210/683 |
| 5,372,719 | 12/1994 | Afeyan | 210/656 |
| 5,503,933 | 4/1996 | Afeyan et al. | 428/407 |

OTHER PUBLICATIONS

Gladkikh et al., "Synthesis of 2–(Glycidyloxy) Ethyl Acrylate and Methacrylate", *J. Org. Chem.*, USSR (Engl. Trans.) 11:1602 (1975). pp. 1602–1604.

Korshunov et al., "Esters of $\alpha,\beta$–Unsaturated Acids with Functional Groups in the Alkoxy Radical", *J. Org. Chem.*, USSR 4:990 (1968). pp. 990–996.

Resowsky, et al., "The Chemistry of Heterocyclic Compounds", *Interscience Publishers*, vol. 19, Part I (1964), pp. 30–57.

Fort, V., et al. "Synthesis of Epoxy (Meth)acrylic Esters by Selective Epoxidation of Unsaturated (Meth)acrylic Esters using the System $H_2O_2$–$Na_2WO_4$ under Phase Transfer Catalysis", *Tetrahedron*, 48:5099 (1992). pp. 5099–5110.

*Primary Examiner*—Ernest G. Therkorn
*Attorney, Agent, or Firm*—David J. Brezner; Flehr Hohbach Test Albritton & Herbert LLP

[57] ABSTRACT

In accordance with the present invention, an improved anion-exchange chromatographic composition has been formed which comprises synthetic resin support particles and anion exchange compounds attached thereto, wherein the anion-exchange compounds comprise an internal reactive group, which may be an ester, ketone or amide group, and a terminal quaternary ammonium salt which functions as an anion-exchange site. The compositions of the present invention exhibit improved hydrolytic stability as compared to other known anion-exchange chromatographic compositions due to the presence of linkers which increase the number of atoms separating the internal reactive group from the nitrogen atom of the terminal ammonium anion-exchange site. Formed articles and methods employing the anion-exchange chromatographic composition are also provided.

15 Claims, No Drawings

HYDROLYTICALLY STABLE RESINS FOR USE IN ANION-EXCHANGE CHROMATOGRAPHY

This is a division of application Ser. No. 08/805,858 filed Mar. 3, 1997.

FIELD OF THE INVENTION

The present invention concerns novel compositions and methods useful in high performance anion-exchange chromatography.

BACKGROUND OF THE INVENTION

The present invention relates to a novel composition which is useful for performing improved liquid chromatography. More particularly, the present invention relates to an improved composition and method for performing anion-exchange chromatography wherein the stationary phase employed exhibits enhanced hydrolytic stability in a variety of eluent solutions, particularly alkaline solutions such as carbonate and/or bicarbonate solutions. The presently described compositions, therefore, allow one to perform anion-exchange chromatography over prolonged periods of time without significant loss of chromatography column performance.

Anion-exchange chromatography is a well known technique for the analysis and separation of anions from solutions wherein the technique typically includes a chromatographic separation step using an eluent solution containing an electrolyte. During the chromatographic separation step, ions of an introduced sample are eluted through a chromatography column which comprises an insoluble stationary phase to which functional anion-exchange groups are attached. Anions traversing through the column and contacting the stationary phase are then capable of exchanging at these positively-charged anion-exchange sites. For the most part, quaternary ammonium groups are employed as the principle functional group of anion-exchange chromatography.

Successful anion-exchange chromatography requires the use of eluents that may exhibit either an acidic or alkaline character, where the eluent may possess various degrees of acidity or alkalinity. Such a property of eluents, however, often has a deleterious effect on the hydrolytic stability of the groups which link the functional anion-exchange site to the insoluble stationary phase. As such, presently known anion-exchange chromatography columns are often usable for only a relatively short period of time, thereby significantly adding to the expense associated with high performance anion-exchange chromatography.

For example, the most common compounds employed for linkage to the stationary phase in anion-exchange columns are acrylate and methacrylate esters whose terminal epoxide groups have been functionalized to possess a quaternary ammonium anion-exchange site. More specifically, anion-exchange stationary phases are commonly prepared from the commercially available compound glycidyl methacrylate which has been functionalized to possess a terminal quaternary ammonium salt. Once functionalized, the glycidyl methacrylate-derived compound possesses a terminal quaternary ammonium anion-exchange site whose nitrogen atom is separated from an ester group which is internal to the backbone of the compound by a total of three carbon atoms. While anion-exchange columns employing such stationary phases have found use for anion-exchange chromatography, such columns are often less than economically practical due to their inherent hydrolytic instability.

Therefore, there is a need for novel compositions useful for anion-exchange chromatography which exhibit improved hydrolytic stability in the presence of various different eluent solutions.

SUMMARY OF THE INVENTION

In accordance with the present invention, a novel anion-exchange hromatography composition has been formed which allows for high performance anion-exchange chromatography over prolonged periods of time due to the enhanced hydrolytic stability exhibited by the stationary phase employed therein. The present invention is based, at least in part, on the novel finding that increasing the number of atoms in the chain between (1) a reactive chemical group, such as an ester, ketone or amide group, which is internal to the chain that links the anion-exchange site to the stationary phase and (2) the functional anion-exchange site itself results in enhanced hydrolytic stability and improved anion-exchange capacity. The present invention, therefore, serves to address the common problem of limited stability of chromatographic stationary phases.

In this regard, one aspect of the present invention provides an anion-exchange chromatographic composition which comprises:

(a) synthetic resin support particles; and (b) anion-exchange compounds attached to said synthetic resin support particles, wherein said anion-exchange compounds comprise a chain comprising (i) an ester, ketone or amide reactive group internal to said chain and (ii) an anion-exchange site terminal to said chain, wherein said anion exchange site consists of a quaternary ammonium salt which is capable of interacting with anions present in an eluent in contact therewith and wherein said quaternary ammonium salt is separated from said internal reactive group by a linker of at least 4 atoms in length. In preferred embodiments, the internal reactive group of the anion-exchange compound is an ester group and/or the linker separating the internal reactive group from the nitrogen atom of the terminal quaternary ammonium anion-exchange site is from 4 to about 13 atoms in length, more preferably from 4 to about 6 atoms in length. The atoms from which the linker is composed may be carbon, oxygen or sulfur atoms which are either unsubstituted or substituted, preferably with alkyl, alkoxyl, hydroxyalkyl or hydroxy groups. The nitrogen atom of the terminal quaternary ammonium salt may also optionally be substituted by one or more substituents, preferably by alkyl or hydroxyalkyl groups.

In other embodiments of the present invention, the above described anion-exchange compounds are attached to the synthetic resin support particles either directly through a covalent bond or by incorporation into a latex polymer which is then deposited onto the surface of the synthetic resin support particles.

Another aspect of the present invention provides a latex polymer which has incorporated therein the above described anion-exchange compound and which is useful for depositing onto the surface of synthetic resin support particles to produce a hydrolytically stable anion-exchange chromatographic composition.

Yet another aspect of the present invention provides a chromatography column which comprises the above described anion-exchange chromatographic composition for use in anion-exchange chromatography.

A further aspect of the present invention provides a method for separating anions from a mixture of anions present in an eluent, wherein the method comprises contacting a chromatography column comprising the above described anion-exchange chromatographic composition with the eluent, thereby allowing anion-exchange to occur.

Other aspects of the present invention will become evident upon a reading of the present specification.

DETAILED DESCRIPTION OF THE INVENTION

A. Anion-exchange chromatographic composition

The anion-exchange chromatographic composition of the present invention comprises synthetic resin support particles and anion-exchange compounds attached to those particles which comprise a chain comprising (i) a reactive group internal to said chain and (2) a terminal quaternary ammonium salt which functions as an anion-exchange site, wherein the internal reactive group and the nitrogen atom of the quaternary ammonium salt are separated by a linker of at least 4 or more atoms in length.

The synthetic resin support particles of the presently described composition may be organic or inorganic in nature and may be formed from any resin material which will support the attachment of the anion-exchange compounds described below. For example, synthetic polymer ion-exchange resins such as poly(phenol-formaldehyde), polyacrylic, or polymethacrylic acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinyinaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds and copolymers of the above monomers are suitable.

The synthetic resin support particles of the present invention can be formed, for example, by well known suspension polymerization techniques which involve suspending droplets of monomer in an aqueous medium in which it is insoluble. Under suitable conditions, the polymer will polymerize. This can be accomplished by mixing the monomer with additives in a suspension medium. When this medium is agitated, the monomer disperses into droplets and agitation continues until polymerization is complete. Preferably, the synthetic resins used are of the macroporous type which are well known in the art, particularly including styrene-divinylbenzene copolymer. The copolymer can be prepared, for example, according to the method of Ikada et al., *Journal of Polymer Science* 12:1829–1839 (1974) or as described in U.S. Pat. No. 4,382,124 to Meitzner et al. Other techniques for the synthesis of synthetic resin support particles are well known in the art and can be found in U.S. Pat. Nos. 3,915,642, 3,918,906, 3,920,398, 3925,019 and the monograph "Dowex: Ion Exchange" 3rd. edition, (1964) published by the Dow Chemical Company, Midland, Mich..

Preferably, the synthetic resin support particles comprise beads of cross-linked polymer or copolymer, such as styrene-divinylbenzene copolymer which copolymerize in the presence of catalyst such as benzoyl peroxide, containing between about 0% to about 100% divinylbenzene monomer by weight. More preferably, the styrene-divinylbenzene copolymer contains between about 25% to about 80% divinylbenzene monomer by weight. A detailed review of the preparation, structure and morphology of styrene-based polymers is provided by Guyot and Bartholin, *Prog. Polym. Sci.* 8:277–332 (1982).

Attached to the synthetic resin support particles of the anion-exchange chromatographic compositions of the present invention are "anion-exchange compounds" which comprise a reactive vinyl group, a chain comprising an internal reactive group, a terminal quaternary ammonium salt anion-exchange site and a linker separating the internal reactive group and the anion-exchange site. The anion-exchange compounds as described herein are derived from precursor molecules having a reactive vinyl group and the general formula (I):

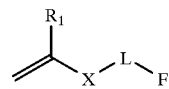

Formula (I)

where "$R_1$" is hydrogen or methyl, "X" is internal to the chain and may be —C(=O)O—, —C(=O)$NR_2$—, where $R_2$ is hydrogen or alkyl of from 1 to about 12 carbon atoms, or —C(=O)—, "L" is a linker that serves to separate group "X" from the terminal functional group "F" and "F" is either an epoxide group or a halogen atom.

As used herein, the phrase "internal reactive group" is intended to mean the reactive chemical group which is created by "X" in formula (I) above being either —C(=O)O—, —C(=O)$NR_2$— or —C(=O)—. For example, when "X" is —C(=O)O—, an internal reactive group ("internal" because it is internal to the chain) which is an ester group is created. If "X" is —C(=O)— an internal reactive group which is a ketone group is formed. In the case where "X" is —C(=O)$NR_2$—, an internal reactive group which is an amide group is formed. In the latter case, the nitrogen of the internal amide group may be hydrogen- or alkyl from 1 to about 12 carbon atoms-substituted, preferably hydrogen-, methyl-, ethyl-, propyl-, isopropyl-, butyl- or isobutyl-substituted, more preferably hydrogen-substituted. In a preferred embodiment, the internal reactive group is an ester group that is incorporated into a latex polymer which is deposited onto the surface of the synthetic resin support particles.

As described above, "F" of formula (I) may be either an epoxide group or a halogen atom. In the case of the latter, the halogen atom is preferably chlorine or bromine. The terminal epoxide group or halogen atom "F" provides a site at which an anion-exchange site may be formed. For example, when "F" is either an epoxide group or halogen atom, such can be reacted with a tertiary amine using well known techniques to produce a terminal quaternary ammonium salt which is capable of interacting with anions present in an eluent in contact therewith. The resulting compound (referred to herein as an anion-exchange monomer) has the following formula (II):

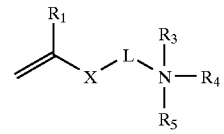

Formula (II)

where "X" has the above described definition and a terminal quaternary ammonium salt anion-exchange site has been created ($NR_3R_4R_5$) where "N" is a nitrogen atom and $R_3$, $R_4$ and $R_5$ are each independently hydrogen, straight-chain or branched alkyl from 1 to about 12 carbon atoms or straight-chain or branched hydroxyalkyl from 1 to about 12 carbon atoms. Preferably, $R_3$, $R_4$ and $R_5$ are each independently hydrogen, methyl, ethyl, propyl, isopropyl, butyl, isobutyl or hydroxyalkyl, more preferably, methyl or hydrogen. In a particularly preferred embodiment, $R_3$ and $R_4$ are methyl and $R_5$ is ethyl. The longer the linker chain between the internal reactive group and the nitrogen atom of the terminal quaternary ammonium salt (see below), the greater the hydrophobicity of the stationary phase. As such, when longer linker groups are employed in the anion-exchange compounds, it is preferred that the nitrogen atom of the terminal quaternary ammonium salt be hydroxyalkyl substituted at at least one site to compensate for the increased hydrophobicity of the stationary phase.

The reaction creating the terminal quaternary ammonium anion-exchange site may occur prior to grafting the anion-exchange monomer to the surface of the synthetic resin support particle or prior to incorporation of the monomer into a latex polymer or after the precursor molecule is incorporated into a latex polymer or after the precursor molecule has been grafted to the surface of the synthetic resin support particle (see below).

Group "L" of the precursor molecule of formula (I) and the anion-exchange monomer of formula (II) represents the linker group which serves to separate group "X" of the internal reactive group from the nitrogen atom of the terminal quaternary ammonium anion-exchange site. In this regard, we have found that internal reactive groups such as ester, ketone and amide groups, when placed in close proximity (i.e., within 3 or fewer atoms) to the terminal quaternary ammonium anion-exchange site, are susceptible to hydrolysis, especially the type of hydrolysis that occurs in aqueous alkaline medium. However, as described herein, we have found that increasing the distance between the internal reactive group and the nitrogen atom of the terminal quaternary ammonium anion-exchange site provides compositions which are more hydrolytically stable during anion-exchange chromatography in alkaline medium. Thus, as described herein, one key to the hydrolytic stability of the stationary phase is the exact distance between the terminal ammonium salt and the internal reactive group.

Commonly-employed stationary phases prepared from the commercially available monomer glycidyl methacrylate have a straight-chain linker of three atoms in length separating the internal reactive ester group from the nitrogen atom of the terminal quaternary ammonium salt. Such stationary phases have proven to be useful for anion-exchange chromatography but have also proven to be susceptible to loss of performance to due hydrolysis of the internal reactive ester group which results in a decrease in the number of quaternary ammonium sites available for anion-exchange. In contrast to these known stationary phases, however, in the anion-exchange compounds of the present invention, "L" comprises a straight chain (not including branching) of at least 4 atoms in length, usually from 4 to about 13 atoms in length, more usually from 4 to about 10 atoms in length, preferably from 4 to about 6 atoms in length, more preferably 6 atoms in length, thereby providing for enhanced hydrolytic stability. "L" may be straight chain or branched, preferably straight-chain, and may comprise saturated or unsaturated carbon atoms and/or heteroatoms such as oxygen or sulfur atoms. "L" is preferably composed of saturated or unsaturated carbon atoms, more preferably saturated carbon atoms. In the case where, "L" is branched, the internal reactive group and the nitrogen atom of the terminal quaternary ammonium salt will still be separated by a chain of at least 4 atoms, wherein the branched linker group will usually comprise no more than 13 total carbon atoms, preferably no more than 10 carbon atoms total, more preferably no more than 7 carbon atoms total. Branching may occur at any atom in the linker chain, preferably at the atom adjacent to the internal reactive group, thereby providing additional protection against hydrolysis of the internal reactive group due to "steric hindrance".

As described above, the linker group "L" may comprise carbon atoms or heteroatoms such as oxygen or sulfur. Usually, the linker group will contain from 0 to about 3 heteroatoms, more usually from 0 to 2, preferably from 0 to 1 and more preferably 1 heteroatoms. Heteroatoms will be placed in the linker groups at positions where they will have no significant effect on the anion separation characteristics of the composition. The determination of where heteroatoms may effectively be positioned in the linker chain is well within the skill level in the art.

One or more atoms of the linker chain separating the internal reactive group from the nitrogen atom of the terminal quaternary ammonium salt may also be independently alkyl-, alkoxyl-, hydroxyalkyl- or hydroxyl-substituted. Such substitutions may conveniently be made at any atom of the linker chain. Alkyl, alkoxyl and hydroxyalkyl substituents usually will have less than about 10 carbon atoms, more usually less than about 6 carbon atoms, preferably less than about 4 carbon atoms and more preferably less than about 3 carbon atoms. Substituents, usually hydroxyl substituents, are often about two atoms removed from the nitrogen atom of the terminal quaternary ammonium salt as a result of functionalization of a terminal epoxide group with a tertiary amine to form the terminal quaternary ammonium salt. Hydroxy-containing substituents located adjacent to or near the terminal quaternary ammonium salt are preferred to compensate for the increased hydrophobicity of anion-exchange compounds having longer linker chains.

Examples of anion-exchange compounds of the present invention may be prepared by reaction of the appropriate precursor molecule with tertiary amine and include, without being limiting of the invention, quaternary ammonium salts of epoxy- or halo-alkyl acrylates or methacrylates where alkyl comprises straight or branched chain alkyl groups with from about 4 to about 13 carbon atoms and optionally containing from 0 to about 3 heteroatoms. Specific examples of such compounds include, for example, 2-glycidyloxyethyl methacrylate, 3,4 epoxybutyl methacrylate, 4,5-epoxypent-2-yl methacrylate, 4,5-epoxypentyl methacrylate and 2-glycidyloxyethyl methacrylate and amido- and keto-derivatives of the above.

Preparation of anion-exchange monomers that are useful as components for polymerization of a latex polymer which is deposited onto the surface of a synthetic resin support particle or for directly grafting to the surface of a synthetic resin support particle is well within the skill level of the ordinarily skilled artisan. For example, for the synthesis of acrylate- and methacrylate-based compounds, the first step generally involves the formation of an appropriate alkenyl acrylate followed by epoxidation of that alkenyl acrylate. For general reviews on techniques for the preparation of alkenyl acrylates and the epoxidation thereof, see Korshunov et al., *J. Org. Chem. USSR* 4:990 (1968) and Resowsky et al., *The Chemistry of Heterocyclic Compounds,* Interscience Publishers, Vol. 19, Part I (1964), respectively. Moreover, the synthesis and purification of many of the epoxyalkyl or haloalkyl acrylates described herein have been described previously, such references providing guidance as to the synthesis of other similar compounds (see, for example, Sandler et al., *Polymer Synthesis,* Chapter 10, Academic Press, London (1974), Gladkikh et al., *J. Org. Chem. USSR* 11:1602 (1975), Fort et al., *Tetrahedron* 48:5099 (1992), U.S. Pat. No. 2,863,851 and U.S. Pat. No. 3,001,975.

The anion-exchange compounds described above may be "attached" to the synthetic resin support particles by a variety of means. For example, the anion-exchange compounds which find use herein may be covalently bonded or grafted to the surface of the synthetic resin support particle by employing the method described in U.S. Pat. No. 5,503,933, issued to Afeyan et al. Specifically, in the method described by Afeyan et al., both the compound being attached to a solid support and the solid support itself possess available unsaturated groups, such as vinyl groups, wherein the compound becomes covalently bonded to the solid support by a free radical reaction between available unsaturated groups. Because both the anion-exchange compounds and synthetic resin support particles of the present invention will possess such available unsaturated groups, the described method may be employed to covalently attach the anion-exchange compounds to synthetic resin support particles.

In addition, the anion-exchange compound may be incorporated into a latex polymer which is deposited onto the surface of the synthetic resin support particles as described in U.S. Pat. No. 5,324,752. Specifically, as described in U.S. Pat. No. 5,324,752, the preparation of latex polymer involves the polymerization of a precursor monomer of formula (I) above (having a vinyl group at one terminus and either an epoxide group or halogen atom at the other terminus) with a divinyl cross-linking monomer which has an available vinyl group at each terminus and optionally another monovinyl monomer. The amount of the optional monovinyl monomer added to the reaction provides a means for diluting or controlling the relative number of quaternary ammonium anion-exchange sites that exist in the final polymer product. The above components are polymerized in the aqueous phase to form a suspension of colloidal particles which are commonly called latex which, in turn, are irreversibly attached to the solid phase via a "dispersant" material that possesses functional sites that irreversibly attach to both the latex polymer and the solid phase, thereby forming a permanent attachment therebetween. The polymerization reaction may be performed by conventional emulsion polymerization techniques, such as by heating and stirring a suspension of monomers in a suitable solvent in the presence of a suitable emulsifying agent. Alternatively, the polymerization may be carried out by a suspension, bulk or solution process followed by grinding the resin to a desired size by mechanical means such as ball mills, rod mills or the like.

Besides the epoxide-containing precursor molecules which are described above, the cross-linking and optionally-added monovinyl diluent monomers may be formed from many different well-known synthetic resins. Specifically, cross-linking monomers are molecules possessing vinyl groups at each terminus wherein the group separating the terminal vinyl groups may be, for example, aromatic or aliphatic and may possess one or more heteroatoms such as oxygen or sulfur. Optionally-added monomers possess one terminal vinyl group and preferably are acrylate- or methacrylate-based. Specific, divinyl cross-linkers which find use in the present invention include, for example, diethyleneglycol dimethacrylate and ethylene methacrylate or respective acrylates thereof. Specific optionally-added monovinyl monomers include, for example, methyl methacrylate and 2-ethoxyethyl methacrylate or respective acrylates thereof. Preferably, the relative reactivities of the selected monomer components are similar, thus assuring an approximately even distribution of each of the monomer units in the final latex polymer product.

Once the latex polymer suspension is prepared, the epoxide or halogen group that has been incorporated into the polymer may be converted to a quaternary ammonium salt by reaction with a tertiary amine as described above. Optionally, the polymer may first be attached to the synthetic resin support followed by conversion of the epoxide or halogen groups to quaternary ammonium salts.

The latex polymer prepared as described above may be "deposited" onto the surface of a synthetic resin support particle (and thereby irreversibly attached thereto) via a bridge of "dispersant" material which irreversibly binds to both the latex polymer and the solid support particles, thereby forming a bridge between (see U.S. Pat. No. 5,324,752). Depending upon solid support particles and the latex polymer, the dispersant may be any material which can inhibit or prevent agglomeration during suspension in the aqueous medium used for polymerization. For example, the dispersant may be selected from any one of the methacrylic aid copolymers, polymaleates, sulfonated polymers, polyvinylpyrrolidone esters, plant-based gums, lignins and cellulose derivatives. In a preferred embodiment, the dispersant material can be formed of polyvinylalcohol, sulfonated lignin, polyvinylpyrrolidine, gum arabic, gelatin, maleic acid-vinylacetate copolymer or styrene-maleic anhydride copolymer. Usually, the dispersant comprises between about 0.1% to about 25% dispersant by weight water.

The irreversible attachment of a dispersant to the synthetic resin support particles can occur by covalent bonding via various mechanisms. one mechanism is by covalent bonding via a free radical polymerization reaction. Free radicals are typically generated in the resin support particle polymer being formed and sustain polymerization of the polymer as well as promote branching, the formation of new chains of bridging and cross-linking. An initiator can be utilized in the polymerization step of the resin support particle which starts and maintains the polymerization reaction. If the initiator concentration is high enough, more free radical sites are generated than can be consumed in the polymerization reaction, and other chemical species that are present, such as dispersant, can react with them. Thus, the dispersant can covalently link to the resin substrate particle polymer. For example, it has been suggested that polyvinylalcohol dispersant can become covalently linked to another polymer if the initiator concentration is high enough. Ikada et al., *Journal of Polymer Science* 12:1829–1839 (1974). While studying the process of particle formation during suspension polymerization, it was observed that polyvinyl chloride can be chemically grafted to the dispersant. Kirk et al., *Encyclopedia of Chemical Technology,* 3rd ed. Vol. 23, pp. 888–890 (1983).

A second method of irreversible attachment of dispersant to the resin support particles can be by permanent physical entanglement. In this mechanism, relatively small polymers, such as sulfonated lignin dispersant or polyvinylalcohol dispersant can become permanently entangled with the resin support particle polymer as the polymerization reaction occurs.

The irreversible attachment of dispersant to the latex polymer produced as described above can occur by covalent bonding, such as described previously herein, or by electrostatic forces. For example, the synthetic resin support particles can be made of styrene-divinylbenzene copolymer and the dispersant can be a mixture of sulfonated lignin and gum arabic dispersant. The sulfonated lignin can irreversibly attach to the synthetic resin support particles either by covalent bonding or by permanent entanglement, thereby providing a negatively-charged surface to which the latex polymer can be agglomerated electrostatically. Specific methods for carrying out the above may be found in U.S. Pat. No. 5,324,752.

After attaching the anion-exchange compounds to the synthetic resin support particles as described above, the functionalized particles can be packed into chromatographic columns using well known methodology and be used for high performance anion-exchange chromatography. For example, U.S. Pat. No. 4,351,909 discloses methods for preparing chromotography columns where the agglomeration of latex polymers onto synthetic resin support particles is done before the column is pressure packed with those particles. On the other hand, chromatography columns may be pressure packed with synthetic resin support particles followed by the subsequent agglomeration of the latex polymer thereon. See U.S. Pat. Nos. 4,438,047 and 4,351,909.

B. Uses of the anion-exchange chromatography compositions

The anion-exchange chromatography compositions of the present invention are primarily useful for the separation of anions in aqueous eluent solutions employed in anion-exchange chromatography. Usually, these solutions are carbonate or bicarbonate solutions, preferably sodium or potassium carbonate solutions.

The anion-exchange chromatographic compositions of the present invention may be employed in methods for separating anions from a mixture of anions. To do so, the anion-exchange compositions of the present invention are packed into chromatography columns for use in anion-exchange chromatography. The column is then contacted with a mixture of anions which are present in an eluent and anion-exchange is allowed to occur at the terminal ammonium salts of the anion-exchange compositions.

Further details of the invention are illustrated in the following non-limiting examples.

EXAMPLE 1

Preparation of 3,4-epoxybutyl Methacrylate.

The preparation of 3,4-epoxybutyl methacrylate can be performed according to the description provided by Fort et al., *Tetrahedron* 48:5099 (1992). However, for the purpose of this synthesis, the aforementioned compound has been prepared according to the following two step synthesis.

Step I—3-Butenyl Methacrylate

To a 250 ml round-bottom flask, containing 3-buten-1-ol (24.7 g) and phenothiazine (0.1 g inhibitor), methyl methacrylate (80 ml) was added, followed by a methanolic solution of magnesium methoxide [prepared by dissolving magnesium metal (0.1 g) in anhydrous methanol (5 ml)]. The stirred mixture was slowly heated and methanol was distilled off (bp 64–70° C.) until the temperature at the distillation head rose to approximately 100° C. and the methyl methacrylate started to distill. The mixture was then cooled to room temperature and the solids were filtered off. The filtrate was fractionated under vacuum. Pure 3-butenyl methacrylate was collected at bp 63–66° C./30 mmHg. Yield: 22.5 g.

Step II—3,4-Epoxybutyl Methacrylate

A solution of 3-butenyl methacrylate (5.1 g) was added slowly to the stirred solution of m-CPBA (10.2) in methylene dichloride (70 ml). The resulting solution was stirred at room temperature for 5 hours and then was washed repeatedly with a dilute aqueous solution of potassium carbonate. The solution obtained was then dried with anhydrous magnesium sulfate and evaporated. Pure 3,4-epoxybutyl methacrylate was isolated by column chromatography on silica gel. Yield 3.9 g.

EXAMPLE 2

Preparation of 4,5-epoxypentyl Methacrylate

Step I—4-Pentenyl Methacrylate

The preparation of 4-pentenyl methacrylate can be perfomed as described in U.S. Pat. Nos. 2,863,851 and 3,001,975. However, for the purposes of the present synthesis, the synthesis was performed essentially as follows. To a solution of 4-penten-1-ol (18.1 g) in N,N-dimethylaniline (40 ml) that was vigorously stirred and cooled in an external ice-bath, a solution of methacryloyl chloride (10 g) in methylene dichloride (40 ml) was added dropwise over 45 min. The reaction mixture was then allowed to warm up to room temperature slowly over 3 hours and then was stirred at this temperature for another 12 hours. The post-reaction mixture was poured into water (1 L) and the organic layer was separated, washed with dilute HCl (3 times), water (2 times) and dried. Remaining solvents were removed under reduced pressure and the residue was then fractionated under vacuum to give pure 4-pentenyl methacrylate, bp. 72–73°/10 mmHg. Yield 9 g.

Step II—4,5-Epoxypentyl Methacrylate

A solution of 4-pentenyl methacrylate (9 g) in methylene dichloride (15 ml) was added to a solution of m-CPBA (18 g) in methylene dichloride (150 ml) and the reaction was allowed to proceed for 5 hr. The reaction mixture was then poured into water, the organic phase was separated and then washed several times with a dilute solution of potassium carbonate. The reaction product was washed with water and then dried with anhydrous magnesium sulfate. A pure product was isolated by column chromatography on silica gel. Yield 7 g.

EXAMPLE 3

Preparation of 4,5-epoxypent-2-yl Methacrylate 4,5-epoxypent-2-yl methacrylate was prepared essentially as follows.

Step I—4-Penten-2-yl Methacrylate

Sodium metal (0.2 g) was dissolved in anhydrous methanol (3 g) and to this solution 4-penten-2-ol (18.5 g) was added followed by the addition of methyl methacrylate (50 g). The resulting mixture was stirred and heated until the methanol started to distill. The distilled methanol was collected at 64–70° C. After the removal of methanol was complete, the temperature was increased and at about 100° C. methyl methacrylate began to distill. At this moment, the reaction mixture was cooled to room temperature and was divided between dilute sulfuric acid (1N, 250 ml) and methylene dichloride (150 ml). The organic phase was then separated and washed with water and dried. Remaining solvents were removed and the residue was then fractionated under vacuum. Pure 4-penten-2-yl methacrylate was collected at 65–68° C./25 mmHg. Yield 17.5 g.

Step II—4,5-Epoxypent-2-yl Methacrylate

A solution of m-CPBA (32 g) in chloroform (150 ml) was cooled in cold water and then 4-penten-2-yl methacrylate (14 g) was added. The mixture was stirred at 23° C. for 6 hours. The post-reaction mixture was then poured into dilute potassium carbonate (300 ml) and the organic layer was separated. The organic layer was washed with three more portions of carbonate, finally with water and then dried. Remaining solvents were then removed and the residue was subjected to chromatography on silica gel. As a result pure 4,5-epoxypent-2-yl methacrylate (9.5 g) was isolated.

EXAMPLE 4

Preparation of 2-glycidyloxyethyl Methacrylate

The preparation of 2-glycidyloxyethyl methacrylate was performed by modification of the procedure of Gladkikh et al., *J. Org. Chem. USSR* 11:1602 (1975) as follows. A solution of 2-hydroxyethyl methacrylate (133 g) in xylene (250 ml) was stirred at 40° C. while boron triflouride etherate (1 ml) was added, followed by epichlorohydrin (49 ml) which was added at such a rate that the temperature did not increase above 75° C. The mixture was stirred for one hour at 75° C. then cooled to room temperature. The solution was transferred into a separating funnel, was washed three times with water and then placed back in a reaction vessel which was being cooled in an ice bath. The mixture was stirred until the temperature dropped to −5° C. at which time 50% aqueous sodium hydroxide (140 ml) was added. The temperature was maintained at −3° C. After the aqueous sodium hydroxide was added, the organic layer was separated and washed several times with water and then dried. Remaining solvents were removed and the residue was fractionated under vacuum, collecting the fraction with bp 75–82° C./0.1 mmHg. The resulting colorless liquid (33 g) contains ethylene glycol dimethacrylate (40%), glycidyloxyethyl methacrylate (50%) and diethylene glycol dimethacrylate (3%). A sample of this mixture (14 g) was subjected to purification using silica gel column. As a result, pure glycidyloxyethyl methacrylate was obtained. Yield 6.8 g.

EXAMPLE 5

Preparation of a Latex Polymer Comprising 2-glycidyloxyethyl Methacrylate

In a 100 ml stoppered bottle, potassium persulfate (0.04 g) was dissolved in de-ionized water. To this solution sodium phosphate (0.1 g) was added followed by the addition of monobasic potassium phosphate (0.05 g), Igepal CA-897 (1.05 g), 2-glycidyloxyethyl methacrylate (1.82 g), diethylene glycol dimethacrylate (0.18 g) and ethoxyethyl methacrylate (0.5 g). The contents of the bottle were stirred and then purged with nitrogen for 15 min. To this mixture, potassium metabisulfite (0.15 g) in water (2.5 g) was added, the stirrbar was removed and the bottle tightly closed. The bottle was slowly (6 rpm) tumbled at 32° C. for two hours. The resulting latex polymer particles were approximately 60 nm in size with approximately 0.100 polydispersity.

EXAMPLE 6

Functionalization (Amination) of a Latex Polymer

The latex polymer prepared in Example 5 above was functionalized as follows. Into a 100 ml stoppered bottle, the latex prepared in Example 5 above (5.0 g) was added followed by the addition of Igepal CA-897 (0.5 g), appropriate tertiary amine (7.0 g of 1M aqueous solution) and nitric acid (1.5 g of 1M aqueous solution). The reaction mixture was left to stir at 32° C. for 90 minutes. At the end of the reaction, the resulting latex size increased to approximately 100 nm with a polydispersity of approximately 0.09. The latex was stabilized by the addition of 7 g of 1M acetic acid.

EXAMPLE 7

Preparation of 2-(2-Methacryloyloxyethoxy)ethyl-dimethylethylammonium bromide 2-(2-Methacryloyloxyethoxy)ethyl-dimethylethylammonium bromide was prepared in a two step synthesis essentially as follows.

Step I—2-(2-Dimethylaminoethoxy)ethyl Methacrylate

A magnesium methoxide solution was prepared by dissolving magnesium metal (4 g) in anhydrous methanol (100 ml) in the presence of a small amount of iodine (approximately 0.1 g). A portion of the resulting solution (18 ml) was placed in a 250 ml reaction vessel and then 2-(2-dimethylaminoethoxy)ethanol (23.6 g) was added, followed by the addition of phenothiazine (0.1 g) and methyl methacrylate (117 g). The mixture was stirred and heated until the methanol started to distill. When all of the methanol was collected, the mixture was cooled to room temperature and the solids were filtered off. The filtrate was subjected to fractionation under reduced pressure. The excess of methyl methacrylate was separated and then pure 2-(2-dimethylaminoethoxy)ethyl methacrylate was collected at 97–102° C./4 mmHg. Yield 22.1 g.

Step II—2-(2-Methacryloyloxyethoxy)ethyl-dimethylethylammonium bromide 2-(2-dimethylaminoethoxy)ethyl methacrylate (8 g) was dissolved in acetone (20 g) and small amounts of hydroquinone (approx. 0.1 g) was added followed by the addition of bromoethane (8 g). The mixture was stirred at room temperature for 24 hours and the solvent was removed under reduced pressure at 25° C. Product was obtained as an amorphous solid. Yield 12.2 g.

EXAMPLE 8

Hydrolytic Stability of Chromatographic Stationary Phases Derived from Glycidyl Methacrylate Versus 2-glycidyloxyethyl Methacrylate Pressure packed anion-exchange chromatography columns were prepared from synthetic resin support particles by the agglomeration thereon of a functional latex polymer wherein the anion-exchange compound incorporated therein was either based upon the commercially available and commonly employed glycidyl methacrylate or upon 2-glycidyloxyethyl methacrylate as described in Examples 4–6. These chromatography columns were then tested in experiments designed to determine the hydrolytic stability of the stationary phases of each column under particular conditions. Specifically, both columns were tested at 60° C. using a series of eluents, differing in composition and pH.

Table 1 shows the results obtained with a glycidyl methacrylate-based anion-exchange stationary phase at 60° C. with an eluent of 2 mM $Na_2CO_3$ and 0.7 mM $NaHCO_3$, pH=10.7 and a flow rate of 2 ml/min. "Exp. Time" refers to the time (hours:minutes) that the experiment was carried out, "Ret. Time" refers to the observed retention time in minutes, "Adj. RT" refers to the adjusted retention time which is the observed retention time minus the retention time of the "water peak" that corresponds to the 0.828 ml void volume of the column, "Dec. RT" refers to the decrease in the retention time in minutes and "Hydrolysis %" refers to the extent of hydrolysis of the anion-exchange sites from the column.

TABLE 1

| Exp. Time | Ret. Time | Adj. RT | Dec. RT | Hydrolysis % |
|---|---|---|---|---|
| 0:0 | 10.27 | 9.44 | 0 | 0 |
| 1:13 | 9.92 | 9.09 | 0.35 | 1.9 |
| 2:13 | 9.69 | 8.86 | 0.58 | 3.1 |
| 3:13 | 9.47 | 8.64 | 0.8 | 4.2 |
| 4:14 | 9.28 | 8.45 | 0.99 | 5.2 |
| 5:14 | 9.09 | 8.26 | 1.18 | 6.2 |

The results in Table 1 demonstrate that over the span of 5 hours and 14 minutes in the presence of the eluent, approximately 6.2 percent of the available anion-exchange sites were hydrolyzed from the glycidyl methacrylate-based chromatography column.

Tables 2 and 3 show the results obtained with a 2-glycidyloxyethyl methacrylate-based anion-exchange stationary phase at 60° C. with an eluent of either 9 mM $Na_2CO_3$, pH=11.1 and a flow rate of 1 ml/min where the column void volume was 2.42 ml (Table 2) or 9 mM $Na_2CO_3$ and 5 mM NaOH, pH=12.0 and a flow rate of 1 ml/min where the column void volume was 2.39 ml (Table 3).

TABLE 2

| Exp. Time | Ret. Time | Adj. RT | Dec. RT | Hydrolysis % |
|---|---|---|---|---|
| 0:0 | 25.15 | 22.73 | 0 | 0 |
| 1:00 | 25.05 | 22.63 | 0.04 | 0.1 |
| 2:01 | 24.95 | 22.53 | 0.2 | 0.4 |
| 3:02 | 24.87 | 22.45 | 0.28 | 0.6 |
| 4:03 | 24.8 | 22.38 | 0.35 | 0.8 |
| 5:04 | 24.72 | 22.3 | 0.43 | 0.9 |

TABLE 3

| Exp. Time | Ret. Time | Adj. RT | Dec. RT | Hydrolysis % |
|---|---|---|---|---|
| 0:0 | 17.19 | 14.8 | 0 | 0 |
| 1:00 | 17.08 | 14.69 | 0.04 | 0.1 |
| 2:01 | 16.99 | 14.6 | 0.2 | 0.7 |
| 3:01 | 16.91 | 14.52 | 0.28 | 0.9 |
| 4:02 | 16.8 | 14.41 | 0.39 | 1.3 |
| 5:02 | 16.71 | 14.32 | 0.48 | 1.6 |

The results presented in Tables 2 and 3, when compared to those presented in Table 1, demonstrate that anion-echange chromatography columns having stationary phases based upon 2-glycidyloxyethyl methacrylate are significantly more hydrolytically stable at alkaline pH's than are anion-exchange chromatography column having stationary phases based upon the commonly employed and commercially available glycidyl methacrylate compound.

The foregoing description details specific methods which can be employed to practice the present invention. Having detailed such specific methods, those skilled in the art will well enough known how to devise alternative reliable methods at arriving at the same information in using the fruits of the present invention. Thus, however, detailed the foregoing may appear in text, it should not be construed as limiting the overall scope thereof; rather, the ambit of the present invention is to be determined only by the lawful construction of the appended claims. All documents cited herein are expressly incorporated by reference.

What is claimed is:

1. A method of separating anions from a mixture of anions present in an eluent, said method comprising contacting a chromatography column with said eluent, said chromatography column comprising an anion-exchange chromatographic composition which comprises:

(a) synthetic resin support particles; and (b) anion-exchange compounds attached to said synthetic resin support particles, said anion-exchange compounds comprising a chain comprising (i) a reactive group internal to said chain, said reactive group being selected from the group consisting of an ester, ketone or amide group and (ii) an anion-exchange site terminal to said chain, said anion-exchange site consisting of a quaternary ammonium salt which is capable of interacting with anions present in an eluent in contact therewith and wherein the nitrogen atom of said quaternary ammonium salt is separated from said internal reactive group by a linker of at least 4 atoms in length, wherein anion-exchange occurs at said terminal anion-exchange site.

2. The method according to claim 1, wherein said internal reactive group is an ester group.

3. The method according to claim 1, wherein said linker is from 4 to about 13 atoms in length.

4. The method according to claim 3, wherein said linker is 4 to about 6 atoms in length.

5. The method according to claim 4, wherein said linker is 6 atoms in length.

6. The method according to claim 1, wherein each of said at least 4 atoms of said linker are selected from the group consisting of substituted or unsubstituted carbon, oxygen or sulfur atoms.

7. The method according to claim 6, wherein each of said at least 4 atoms of said linker are substituted or unsubstituted carbon atoms.

8. The method according to claim 7, wherein said carbon atoms are hydrogen saturated.

9. The method according to claim 1, wherein at least one of said at least 4 atoms of said linker is oxygen or sulfur.

10. The method according to claim 1, wherein at least one atom of said linker is substituted with a group selected from the group consisting of alkyl, alkoxyl, hydroxyalkyl or hydroxyl.

11. The method according to claim 10, wherein the substitution is two atoms removed from the nitrogen atom of said quaternary ammonium salt.

12. The method according to claim 11, wherein the substituent is a hydroxyl group.

13. The method according to claim 1, wherein the nitrogen atom of said quaternary ammonium salt is substituted with at least one group selected from the group consisting of alkyl or hydroxyalkyl.

14. The method according to claim 13, wherein the substituent is methyl.

15. The method according to claim 13, wherein said nitrogen atom of said quaternary ammonium salt is substituted with two methyl groups and one ethyl group.

* * * * *